United States Patent [19]
Saito et al.

[11] Patent Number: 5,668,221
[45] Date of Patent: Sep. 16, 1997

[54] FLUORINE-CONTAINING ELASTOMER COMPOSITION

[75] Inventors: Satoru Saito, Kitaibaraki; Haruyoshi Tatsu, Hitachi, both of Japan; Sergei Rafailovich Sterlin; Yurii Vilovich Zeifman, both of Moscow, Russian Federation; Sergei Anatol'evich Postovoi, Moscow region, Russian Federation

[73] Assignee: Nippon Mektron, Limited, Tokyo, Japan

[21] Appl. No.: 680,171

[22] Filed: Jul. 15, 1996

[30] Foreign Application Priority Data

Jul. 19, 1995 [JP] Japan ................. 7-205178

[51] Int. Cl.$^6$ ........................................ C08F 8/30
[52] U.S. Cl. ..................... 525/359.3; 525/326.3; 525/377
[58] Field of Search ................. 525/359.3, 377

[56] References Cited

U.S. PATENT DOCUMENTS 4,645,799  2/1987  Wachi et al. ............... 525/326.3
4,943,614  7/1990  Miyazaki et al. ........... 525/326.3
5,502,115  3/1996  Chiodini et al. ............ 525/326.3

FOREIGN PATENT DOCUMENTS 2-59177  6/1984  Japan.

*Primary Examiner*—Bernard Lipman
*Attorney, Agent, or Firm*—Barnes & Thornburg

[57] ABSTRACT

A fluorine-containing elastomer composition comprising a fluorine-containing elastomer having a cyano group as a cross-linking agent and a bisamidoxime compound represented by the following general formula as a vulcanizing agent:

$$HON=\underset{\underset{H_2N}{|}}{C}-(CF_2)_n-\underset{\underset{NH_2}{|}}{C}=NOH$$

where n is an integer of 1 to 10, gives vulcanization products having a satisfactory compression set without any problem of processability such as roll kneadability, etc. during the heading or during the vulcanization of the fluorine-containing elastomer having a cyano group as a cross-linkable group.

4 Claims, No Drawings

5,668,221

FLUORINE-CONTAINING ELASTOMER COMPOSITION

BACKGROUND OF THE INVENTION

1. Field of the Invention

The present invention relates to a fluorine-containing elastomer composition, and more particularly to a fluorine-containing elastomer composition containing a novel type of compound as a vulcanizing agent.

2. Related Prior Art

JP-B-2-59177 discloses a fluorine-containing elastomer composition, which comprises a terpolymer of tetrafluoroethylene, perfluoro(methyl vinyl ether) and perfluoro unsaturated nitrile compound represented by the following general formula:

where n: 1 to 2; m: 1 to 4, and a bis(aminophenyl) compound represented by the following general formula:

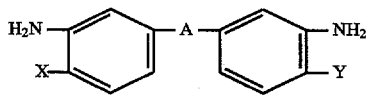

wherein A is an alkylidene group having 1 to 6 carbon atoms, a perfluoroalkylidene group having 1 to 10 carbon atoms, a $SO_2$ group, an O group, a CO group or a carbon-carbon bond directly linking with two benzene rings; X and Y each are a hydroxyl group or an amino group.

The present inventors previously proposed a bisamidrazone compound represented by the following general formula as a novel vulcanizing agent capable of giving vulcanization products having a satisfactory compression set, when used as a vulcanization agent for fluorine-containing elastomer having a cyano group as a cross-linkable group (Japanese Patent Application No. 6-282943).

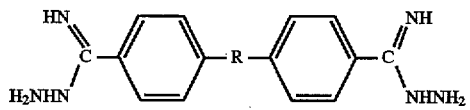

The proposed bisamidrazone compound can give vulcanization products having a satisfactory compression set, when used as a vulcanizing agent for fluorine-containing elastomer having a cyano group as a cross-linkable group, but is very reactive with the cyano group as a cross-linkable group and sometimes causes scorching phenomena during the preparation of a composition by kneading through a roll, etc. before the vulcanization, depending on kneading temperature, shearing force, etc.

SUMMARY OF THE INVENTION

An object of the present invention is to provide a novel vulcanizing agent compound capable of giving vulcanization products having satisfactory heat resistance and solvent resistance without any problem of processability such as roll kneadability, etc. during the kneading of the fluorine-containing elastomer having a cyano group as a cross-linkable group or during the vulcanization.

DETAILED DESCRIPTION OF THE INVENTION

According to the present invention, there is provided a fluorine-containing elastomer, which comprises a fluorine-containing elastomer having a cyano group as a cross-linkable group and a bisamidoxime compound represented by the following general formula as a vulcanizing agent:

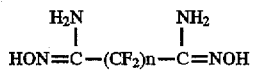

where n is an integer of 1 to 10.

The bisamidoxime compound represented by the foregoing general formula can be readily prepared by reaction of a dinitrile compound represented by the following general formula with hydroxylamine:

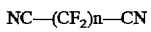

Generally, hydroxylamine is stabilized as a hydrochloride, etc., and thus is used upon liberation as hydroxylamine with such a base as sodium alkoxide, etc. under anhydrous conditions.

In the reaction with a dinitrile compound with hydroxylamine, at least two parts by mole of hydroxylamine is used per part by mole of dinitrile compound. The reaction can readily take place in a solvent such as methanol, ethanol, etc. at room temperature.

The thus obtained bisamidoxime compound is used as a vulcanizing agent for fluorine-containing elastomer having a cyano group as a cross-linkable group. A terpolymer comprising 45 to 75% by mole of tetrafluoroethylene, 54.8 to 20% by mole of perfluoro(lower alkyl vinyl ether) or perfluoro(lower alkoxy-lower alkyl vinyl ether) and 0.2 to 5% by mole of a perfluoro unsaturated nitrile compound, the sum total being 100% by mole, is usually used as such a fluorine-containing elastomer.

As a perfluoro(lower alkyl vinyl ether), perfluoro(methyl vinyl ether) is usually used. As a perfluoro(lower alkoxy-lower alkyl vinyl ether), for example, the following ethers are used:

| | |
|---|---|
| $CF_2=CFOCF_2CF(CF_3)OC_nF_{2n+1}$ | (n: 1 to 5) |
| $CF_2=CFO(CF_2)_3OC_nF_{2n+1}$ | (n: 1 to 5) |
| $CF_2=CFOCF_2CF(CF_3)O(CF_2O)_mC_nF_{2n+1}$ | (n: 1 to 5, m: 1 to 3) |
| $CF_2=CFO(CF_2)_2OC_nF_{2n+1}$ | (n: 1 to 5), | where the ethers, particularly whose $C_nF_{2n+1}$ group is a $CF_3$ group, are preferably used.

As a perfluoro unsaturated nitrile compound as a cross-linking site monomer, the following compounds are used:

| | |
|---|---|
| $CF_2=CFO(CF_2)_nOCF(CF_3)CN$ | (n: 2 to 5) |
| $CF_2=CFO[OCF_2CF(CF_3)]_nO(CF_2)_mCN$ | (n: 1 to 2, m: 1 to 6) |
| $CF_2=CFO(CF_2)_nCN$ | (n: 2 to 12) |
| $CF_2=CF[OCF_2CF(CF_3)]_nOCF_2CF(CF_3)CN$ | (n: 1 to 2) |

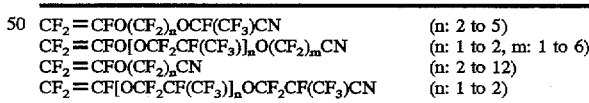

(n: 1 to 6)

The terpolymer can be further copolymerized with fluorinated olefins or various vinyl compounds to such a degree as not to inhibit the copolymerization reaction and impair the physical properties of vulcanization products (i.e. to not more than abut 20% by mole). Fluorinated Olefins for use in the present invention include, for example, vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, etc. Vinyl compounds for use in the present invention include, for example, ethylene, propylene, 1-butene, isobutylene, methyl ethyl ether, ethyl vinyl ether, butyl vinyl ether, cyclohexyl vinyl ether, vinyl acetate, vinyl propionate, vinyl chloride, vinylidene chloride, trifluorostyrene, etc.

About 0.1 to about 5 parts by weight, preferably about 0.2 to about 3 parts by weight, of the bisamidoxime compound represented by the foregoing general formula is used as a vulcanizing agent per 100 parts by weight of the terpolymer.

The fluorine-containing elastomer composition comprising the foregoing components as essential can further contain appropriate ingredients, when required, for example, an inorganic filler such as carbon black, silica, etc.; an acid receptor such as divalent metal oxides or hydroxides including lead (II) oxide, zinc oxide, magnesium hydroxide, calcium hydroxide, etc., hydrotalcite, etc.; a pigments; a processing additive; a plasticizer, etc. The composition can be prepared by kneading through rolls, a kneader, Bambury mixer, etc. The composition is cured by heating at a temparature of abut 150° to about 220° C. for about 5 to about 60 minutes in a compression molding machine, etc. Post curing (secondary vulcanization) is carried out at a temparature of abut 200° to abut 320° C. for about 10 to about 70 hours. To obtain vulcanization products having good physical properties, it is preferable to conduct the secondary vulcanization in an inert gas atmosphere such as a nitrogen gas atmosphere, etc.

According to the present invention vulcanization products having a satisfactory compression set can be obtained without any problem of processability such as roll kneadability, etc. by using a bisamidoxime compound as a vulcanizing agent for fluorine-containing elastomer having a cyano group as a cross-linkable group.

PREFERRED EMBODIMENTS OF THE INVENTION

The present invention will be described in detail below, referring to Examples.

REFERENCE EXAMPLE

Hydroxylamine hydrochloride was subjected to reaction with the equivalent weight of sodium methoxide in methanol to liberate hydroxylamine, which was then subjected to reaction with perfluoroadiponitrile to obtain a bisamidoxime compound having a melting point of 230° C. (decomposition), represented by the following formula as white crystals:

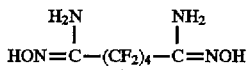

EXAMPLE 1

To 100 parts by weight of terpolymer of tetrafluoroethylene-perfluoro(methyl vinyl ether) -perfluoro (3, 7-dioxa-8-cyano-1-nonene) in a molar ratio of 63.5:34.9:1.6 [Copolymer A; η sp/c: 0.59 dl/g, measured at 35° C. after dissolution of 0.1 g of Copolymer A in 100 ml of a solvent mixture of perfluoro(2-butyltetrahydrofuran)/ perfluoro(2, 2, 3-trichlorobutane)/ethylene glycol dimethyl ether in a volume ratio of 40:60:3] were added 0.6 parts by weight of the bisamidoxime compound obtained in the foregoing Reference Example and 20 parts by weight of MT carbon black. The mixture was each kneaded at a temparature of 40° to 45° C. through a two-roll mill, and the kneaded mixture was then subjected to press vulcanization (primary vulcanization) at 180° C. for 30 minutes and then to oven vulcanization (secondary vulcanization) in a nitrogen gas atmosphere under the following conditions:

Heating at 90° C. for 4 hours,

Heating temperature elevation from 90° C. to 204° C. over 6 hours,

Heating at 204° C. for 18 hours,

Heating temperature elevation from 204° C. to 288° C. over 6 hours and

Heating at 288° C. for 18 hours.

EXAMPLE 2

In Example 1, a terpolymer of tetrafluoroethyleneperfluoro(methyl vinyl ether) -perfluoro (3-oxa-8-cyano-1-octene) in a molar ratio of 68.8:30.0:1.2 (Copolymer B) was used in place of Copolymer A.

EXAMPLE 3

In Example 2 using Copolymer B, the amount of bisamidoxime compound was changed from 0.6 parts by weight to 0.4 parts by weight.

COMPARATIVE EXAMPLE 1

In Example 1 using Copolymer A, 0.5 parts by weight of bisamidrazone of 2,2-bis(4-carboxyphenyl) hexafluoropropane represented by the following formula was used in place of the bisamidoxime compound obtained in Reference Example:

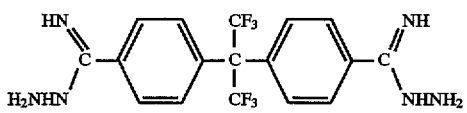

COMPARATIVE EXAMPLE 2

In Example 2 using Copolymer B, 0.4 parts by weight of bisamidrazone of 2,2-bis(3-carboxyphenyl) hexafluoropropane was used in place of the bisamidoxime compound obtained in Reference Example.

In the foregoing Examples 1 to 3 and Comparative Examples 1 and 2, measurements and evaluation were made for the following items:

Cure rate: A minimum torque and a torque 25 minutes thereafter were measured by JSR (Japan Synthetic Rubber Co., Ltd.) curelastometer at 180° C.

Flow at molding: Flow behavior of gum stock at press molding of P-24 O-ring was evaluated Compression set: Compression set was measured at 275° C. or 300° C. for 70 hrs. according to ASTM Method-B using P-24 O-ring Hexamethylenediamine resistance: Volumic swelling was measured after immersion in hexamethylenediamine at 140° C. for 70 hrs.

Water resistance: Volumic swelling was measured after immersion in water at 200° C. for 70 hrs. under pressure Results are shown in the following Table.

TABLE

| Measurement, evaluation | Example 1 | Example 2 | Example 3 | Comp. Ex. 1 | Comp. Ex. 2 |
|---|---|---|---|---|---|
| [Cure rate] | | | | | |
| Minimum torque (kg · cm) | 4.8 | 5.0 | 5.1 | 8.2 | 10.5 |
| After 25 mins. (kg · cm) | 10.3 | 13.2 | 11.8 | 13.7 | 14.1 |
| [Flow at molding] Poor flow | None | None | None | Slightly | Occurred |
| [Compression set] | | | | | |
| 275° C. | 22 | 30 | 25 | 29 | 28 |
| 300° C. | 43 | 46 | 45 | 32 | 35 |
| [Diamine resistance] Vol. swelling (%) | 43 | 37 | 29 | 42 | 23 |
| [Water resistance] Vol. swelling (%) | 3 | 6 | 6 | 1 | 4 |

What is claimed is:

1. A fluorine-containing elastomer composition, which comprises a fluorine-containing elastomer having a cyano group as a cross-linkable group and a bisamidoxime compound represented by the following general formula as a vulcanizing agent:

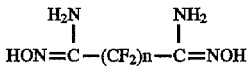

where n is an integer of 1 to 10.

2. A fluorine-containing elastomer composition according to claim 1, wherein the fluorine-containing elastomer having a cyano group as a cross-linkable group is a terpolymer comprising 45 to 75% by mole of tetrafluoroethylene, 54.8 to 20% by mole of perfluoro(lower alkyl vinyl ether) or perfluoro-(lower alkoxy-lower alkyl vinyl ether) and about 0.2 to 5% by mole of a perfluoro unsaturated nitrile compound, the sum total being 100% by mole.

3. A fluorine-containing elastomer composition according to claim 1, wherein about 0.1 to 5 parts by weight of the bisamidoxime compound is used as a vulcanizng agent per 100 parts by weight of the fluorine-containing elastomer.

4. A fluorine-containing elastomer composition according to claim 1, wherein about 0.2 to 3 parts by weight of the bisamidoxime compound is used as a vulcanizng agent per 100 parts by weight of the fluorine-containing elastomer.

* * * * *